US012328143B1

(12) United States Patent
Campos et al.

(10) Patent No.: US 12,328,143 B1
(45) Date of Patent: Jun. 10, 2025

(54) OPTICALLY INTEGRATED ANTENNA SYSTEMS AND METHODS

(71) Applicant: CABLE TELEVISION LABORATORIES, INC., Louisville, CO (US)

(72) Inventors: Luis Alberto Campos, Superior, CO (US); Jing Wang, Broomfield, CO (US); Mu Xu, Broomfield, CO (US); Zhensheng Jia, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 167 days.

(21) Appl. No.: 18/096,793

(22) Filed: Jan. 13, 2023

Related U.S. Application Data

(60) Provisional application No. 63/229,160, filed on Jan. 13, 2022.

(51) Int. Cl.
*H04B 10/112* (2013.01)
*H01Q 15/02* (2006.01)
*H01Q 25/00* (2006.01)
*H04Q 11/00* (2006.01)

(52) U.S. Cl.
CPC ........... *H04B 10/112* (2013.01); *H01Q 15/02* (2013.01); *H01Q 25/008* (2013.01); *H04Q 11/0005* (2013.01); *H04Q 2011/0026* (2013.01)

(58) Field of Classification Search
CPC .... H04B 10/112; H01Q 15/02; H01Q 25/008; H04Q 11/0005; H04Q 2011/0026
USPC ........................................................ 398/115
See application file for complete search history.

(56) References Cited

U.S. PATENT DOCUMENTS

| | | | | |
|---|---|---|---|---|
| 5,861,845 A * | 1/1999 | Lee | ........................... | H01Q 3/22 342/374 |
| 7,084,811 B1 * | 8/2006 | Yap | ....................... | H01Q 3/2676 342/373 |
| 11,564,020 B1 * | 1/2023 | Xu | ...................... | H04Q 11/0005 |
| 12,051,859 B2 * | 7/2024 | Galli | ................... | H01Q 3/2676 |
| 2017/0294966 A1 * | 10/2017 | Jia | ........................... | H04J 14/06 |
| 2018/0198551 A1 * | 7/2018 | Cavaliere | ............... | H04B 10/11 |
| 2022/0166137 A1 * | 5/2022 | Galli | ..................... | H04B 10/00 |

FOREIGN PATENT DOCUMENTS

WO      WO-2020101742 A1 *    5/2020    ............ H01Q 3/242

* cited by examiner

*Primary Examiner* — Abbas H Alagheband
(74) *Attorney, Agent, or Firm* — Josh C. Snider; Snider IP

(57) ABSTRACT

A radio system includes a feed network, an edge wavelength switching system (EWSS), a photodetector, and a broadband lens-based antenna subsystem. The feed network aggregates a plurality of unmodulated optical carriers and modulated optical carriers for delivery to an optical link. The EWSS receives the plurality of unmodulated optical carriers and modulated optical carriers from the optical link, and selects a first unmodulated carrier and a first modulated carrier as a first selected optical carrier pair. The photodetector receives the first selected carrier pair from the EWSS, and generates a first electrical signal from an optical beat of the first unmodulated carrier with the first modulated carrier. The broadband lens-based antenna subsystem receives the first electrical signal from the photodetector, propagates the received first electrical signal through a lens body, and outputs a first directional wireless beam signal containing signal data from the first modulated carrier.

19 Claims, 8 Drawing Sheets

OPTICALLY INTEGRATED ANTENNA SYSTEMS AND METHODS

CROSS REFERENCE TO RELATED APPLICATIONS

This application claims the benefit of and priority to U.S. Provisional Patent Application Ser. No. 63/299,160, filed Jan. 13, 2022, the subject matter thereof which is incorporated herein by reference in its entirety.

FIELD

The field of the disclosure relates generally to communication networks, and more particularly, to communication networks utilizing photonically integrated antenna systems.

BACKGROUND

Conventional telecommunication networks use radio technology and antenna systems to transmit wireless radio frequency (RF) communication signals. These conventional radio antenna and systems without, have evolved to very high levels of complexity, with an increasing number of antenna elements being utilized in the typical antenna system. In turn, the feed networks for such a complex, multiple-antenna system has become more intricate, resulting in significant signal loss and narrower bandwidths through the system. Accordingly, conventional radio and antenna systems are generally limited to very specific and narrow applications. For example, a typical radio communication implementation will utilize one antenna system having the RF chain of the antenna tailored for a single RF band, which is not an economically sustainable approach where implementation of multiple, largely separated carrier frequencies is desired, such as in the case of sub-6 GHZ, 10 GHz, and/or millimeter wave (mmW) carriers.

Accordingly, there is a need in this field to greatly reduce the complexity of RF antenna systems, widen the operational bandwidths thereof, and increase the general applicability of the antenna system to a variety of different implementations. Even in the case where the bandwidth limitations of particular radiating antenna-elements of an antenna system may be acceptable for a given application, it is nevertheless desirable to avoid the inherited limitations of the complex elements required to support such antenna elements. Accordingly, there is a need in the field to develop a single antenna system having multi-band compatibility.

SUMMARY

In an embodiment, a radio system includes a feed network configured to aggregate a plurality of unmodulated optical carriers and modulated optical carriers for delivery to an optical link. The radio system further includes an edge wavelength switching system (EWSS) configured to (i) receive the plurality of unmodulated optical carriers and modulated optical carriers from the optical link, and select a first unmodulated carrier and a first modulated carrier as a first selected optical carrier pair. The radio system further includes a first photodetector configured to (i) receive the first selected carrier pair from the EWSS, and (ii) generate a first electrical signal from an optical beat of the first unmodulated carrier with the first modulated carrier. The radio system further includes a broadband lens-based antenna subsystem configured to (i) receive the first electrical signal from the first photodetector, (ii) propagate the received first electrical signal through a lens body, and (iii) output a first directional wireless beam signal containing signal data from the first modulated carrier.

In an embodiment, a radio system, includes an uplink lens-based antenna subsystem configured to (i) receive wireless signal information from a first signal source broadcasting from a first wavefront direction, (ii) propagate the received wireless signal information through a lens body, and (iii) output the propagated wireless signal information from a first feed point as a first electrical signal. The radio system further includes a first envelope detector configured to (i) receive the first electrical signal from the first feed point, and (ii) down-convert the first electrical signal into a first baseband optical signal. The radio system further includes an edge wavelength switching system (EWSS) configured to (i) receive the first baseband optical signal, and (ii) aggregate the first baseband signal with other optical signals for delivery to an optical link as an aggregated optical signal. The radio system further includes an optical hub including an array of photodetectors and a uplink signal processor. Each photodetector of the array of photodetectors is configured to (i) receive at least two optical signals of the aggregated optical signal from the optical link, and (ii) generate, for delivery to the uplink signal processor, a second electrical signal from an optical beat of the received at least two optical signals.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
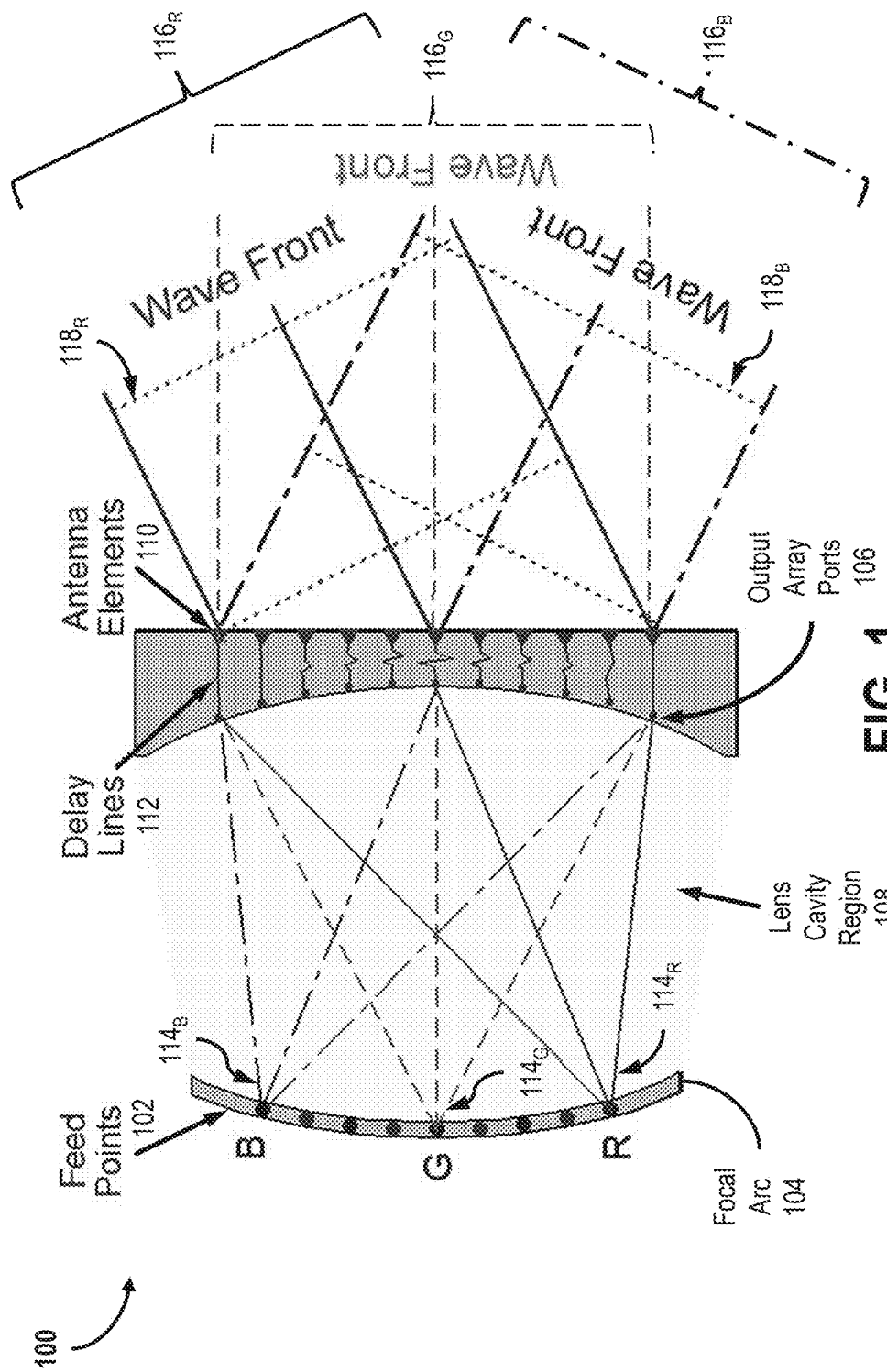
FIG. 1 is a schematic illustration of a conventional two-dimensional RF/microwave lens.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

As used herein, "modem termination system" (MTS) refers to a termination unit including one or more of an Optical Network Terminal (ONT), an optical line termination (OLT), a network termination unit, a satellite termination unit, a cable modem termination system (CMTS), and/or other termination systems which may be individually or collectively referred to as an MTS.

As used herein, "modem" refers to a modem device, including one or more a cable modem (CM), a satellite modem, an optical network unit (ONU), a DSL unit, etc., which may be individually or collectively referred to as modems.

As used herein, the term "coherent transceiver," unless specified otherwise, refers to a point-to-point (P2P) or point-to-multipoint (P2MP) coherent optics transceiver having a coherent optics transmitting portion and a coherent optics receiving portion. In some instances, the transceiver may refer to a specific device under test (DUT) for several of the embodiments described herein.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

The person of ordinary skill in the art will understand that the term "wireless," as used herein in the context of optical transmission and communications, including free space optics (FSO), generally refers to the absence of a substantially physical transport medium, such as a wired transport, a coaxial cable, or an optical fiber or fiber optic cable.

As used herein, the term "data center" generally refers to a facility or dedicated physical location used for housing electronic equipment and/or computer systems and associated components, e.g., for communications, data storage, etc. A data center may include numerous redundant or backup components within the infrastructure thereof to provide power, communication, control, and/or security to the multiple components and/or subsystems contained therein. A physical data center may be located within a single housing facility, or may be distributed among a plurality of co-located or interconnected facilities. A 'virtual data center' is a non-tangible abstraction of a physical data center in a software-defined environment, such as software-defined networking (SDN) or software-defined storage (SDS), typically operated using at least one physical server utilizing a hypervisor. A data center may include as many as thousands of physical servers connected by a high-speed network.

As used herein, the term "hyperscale" refers to a computing environment or infrastructure including multiple computing nodes, and having the capability to scale appropriately as increased demand is added to the system, i.e., seamlessly provision infrastructure components and/or add computational, networking, and storage resources to a given node or set of nodes. A hyperscale system, or "hyperscaler" may include hundreds of data centers or more, and may include distributed storage systems. A hyperscale system may utilize redundancy-based protection and/or erasure coding, and may be typically configured to increase background load proportional to an increase in cluster size. A hyperscale node may be a physical node or a virtual node, and multiple virtual nodes may be located on the same physical host. Hyperscale management may be hierarchical, and a "distance" between nodes may be physical or perceptual. A hyperscale datacenter may include several performance optimized datacenters (PODs), and each POD may include multiple racks and hundreds and thousands of compute and/or storage devices."

The systems and methods described herein provide a number of innovative solutions that drastically reduce the complexity of RF antenna systems, all significantly expanding the bandwidth availability and operational capabilities of the same antenna system. The present embodiments uniquely leverage optical technologies to replace the much more complex and expensive conventional antenna system technologies and avoid the associated limitations thereof. Radio systems according to the present techniques achieve high broadband operation, with simultaneous beam steering ability of multiple beams from a single antenna system.

The systems and methods described herein drastically reduce the architectural and operational complexity of an RF antenna system through innovative implementations of two-dimensional (2D) and three-dimensional (3D) optical lenses with an edge wavelength switching system (EWSS) and/or optical filtering technique developed by the present inventors. Although optical technologies have been previously proposed for use in some military/defense communication systems, these earlier proposals were bulky, heavy, and costly to implement, and particularly at lower frequencies that require significantly larger antenna systems. Radar communication, for example, operates in the 400 MHZ-36 GHz RF frequency range using high-complexity antenna systems, and the overall system complexity of such conventional proposals only increases for operation using higher frequency ranges, such as those implemented in many fifth generation (5G) and 5G new radio (5GNR) applications.

According to the embodiments though, these challenges are addressed and solved by the systems and methods described herein. The present systems and methods provide innovative ultra-broadband antenna solutions that realize many advantages over conventional RF antenna systems, which are considerably more complex, heavy, high-loss, and large-footprint in comparison with the innovative optical and photonic solutions presented herein. The present systems and methods are further advantageous over conventional solutions because, whereas the complex electronic components of conventional antenna systems are susceptible to being disabled by an electromagnetic pulse (EMP), the comparatively lightweight and low-loss optical solutions herein provide significant EMP immunity through implementation of photonically-integrated antenna systems utilizing 2D and 3D lenses. A conventional 2D optical lens is described further below with respect to FIG. 1.

FIG. 1 is a schematic illustration of a conventional two-dimensional (2D) RF/microwave lens 100. In the embodiment depicted in FIG. 1, lens 100 is depicted as a Rotman lens by way of example, and not in a limiting sense. The person of ordinary skill in the art will understand that other RF lens architectures may be utilized without departing from the scope herein.

As a Rotman lens, lens 100 realizes unique beam-steering characteristics, providing multiple-beam operability, as well as the capability to detect targets in different directions simultaneously without moving the antenna system that includes lens 100. Conventional lens 100 includes a plurality of feed points 102 along a focal arc 104 disposed at one end of a substantially planar architecture of 2D lens 100. In this context, "2D" thus refers to the generally planar operation of lens 100. The person of ordinary skill in the art will understand that lens 100 will have some thickness in a direction parallel to the planar operation, but which does not substantially affect the operating principles described herein. In contrast, a 3D lens structure is described further below with respect to FIG. 8.

Lens 100 further includes a plurality of output ports 106 disposed in an array opposite feed points 102 with respect to a substantially planar lens cavity region 108 disposed therebetween. Output ports 106 are in turn each connected to a particular antenna element 110, of a plurality of arrayed radiating antenna elements 110, by a respective delay line 112 of a plurality of delay lines 112 (sometimes referred to as phase correction lines). In the conventional lens configuration, a particular delay line 112 will have a different physical length than most, if not all, of the other delay lines in the array.

In operation, when lens 100 is excited at a particular feed point 102, a signal 114 propagates through lens cavity region 108 and then received by a number of different output ports 106, each of which then transmits the received signal to a respective antenna element 110 over the particular delay line 112 connected to that antenna element 110. The several receiving antenna elements 110 then collectively transmit the several signals 114, which originate from the same feed point 102, into free space as an individual wavefront 116 exhibiting a true time delay (TDD) characteristic 118 between the respective signals 114 output from different antenna elements 110, but which originate from the same feed port 102, and independent of the frequency of signal 114. TDD cannot be realized with conventional antenna systems using phase arrays.

2D lens 100 thus functions as a 2D RF/microwave lens that generates beams for a particular signal 114 that are tilted in specific directions depending on which feed point 102 is selected. Lens 100 thus operates to orchestrate, within lens cavity region 108, reflections having phase shifts such that the direction of particular wavefronts 116 from arrayed antenna elements 110 depend only on the input direction of incoming signal 114, that is, from which particular feed port 102 the beams of signal 114 originate. By switching between the several feed points 102, radiated beams of a signal 114 may be scanned through the entire field of view of lens 102.

Accordingly, for a downlink transmission, lens 100 is considered to operate in "receive mode," where a feed point 102 (e.g., feed point 102R) is used to generate several tilted beams of a signal 114 (e.g., signal 114R) for one wavefront 116 (e.g., wavefront 116R). A downlink transmission configuration is described further below with respect to FIG. 5. In the case of an uplink transmission, lens 100 is considered to operate in "transmit mode," where energy is directed into one or more antenna elements 110, which in turn feed this directed energy into a particular feed point 102 in reverse operation. An uplink transmission configuration is described further below with respect to FIG. 7.

Optically Integrated Lens Antenna Systems

Rotman lenses have been recently proposed as retrodirective antennas for 5G applications and millimeter wave (mmW) frequency communications. These recent proposals have utilized precision machining to create the waveguide structure for a Rotman lens measuring approximately 7 cm long. These existing proposals aim to replace existing mmW 5G antennas with a Rotman lens-based antenna system to achieve the advantages, described above, of the more-efficient, smaller-footprint optics. Although promising, these recent proposals merely substitute the more efficient optical lens for the complex existing electronics-based antenna systems, which existing systems are limited to beam steering of a single signal at a single frequency.

This recently proposed Rotman lens-based substitution improves the steerability of the single-frequency beam, but does not address the particular challenges to newer 5G systems regarding broadband communication of multiple frequencies simultaneously, or how to dynamically control or change the transmission frequencies in an agile manner. These additional challenges are addressed and solved according to the following embodiments. For ease of explanation, the following description refers to Rotman lenses by way of example, and not in a limiting sense. The person of ordinary skill in the art though, will understand that other types of photonically-enabled 2D lenses may be implemented without departing from the scope herein.

The present systems and methods leverage the center frequencies, numbers, types, and separation of radiating antenna elements (e.g., antenna elements 110) to generate multiple beams of different widths having true-time delay beamforming characteristics. In the electrical or RF domain of a conventional feed network, extensive RF circuitry is required to generate a single beam having desired characteristics. In contrast, the optically-integrated antenna systems of the present embodiments leverage the optical functionality, described above, to drastically simplify the entire radio system. Different from the recent proposals to simply replace one antenna with a Rotman lens, which merely results in an incremental improvement, the present systems and methods enable a significant redesign, and thus a global improvement, of the entire radio system.

Referring back to FIG. 1, each wavefront 116 may be considered to correspond to a particular beam. The present systems and methods herein improve upon the recent Rotman lens-based proposals by advantageously enabling the simultaneous selection of more than one beam. This capability to select multiple beams enables centralized control such that (i) each beam may carry a different signal, and/or (ii) adjacent beams may be configured for beam synthesis, i.e., the adjacent beams carry the same signal in a synchronized fashion to synthesize a wider beamwidth for the synchronized signal, as described further below with respect to FIG. 6.

By conducting most of the radio functions in the optical domain, the present systems and methods may be further optimized by disposing control of this functionality in a centralized remote location, e.g., where virtualization is optimal, and where protection and security measures may more easily be implemented. This centralization further enables lower initial implementation costs, and also easy scalability as the system needs expand and photonics technology evolves.

The evolution of optical components is a significant consideration. As demonstrated herein, the integration of photonic devices into radio systems enables innovative implementation, in the optical domain, of functionality that is conventionally performed in the RF domain. These capabilities are significantly advantageous with respect to the generation of multiple broadband RF mmW signals for developing 5G systems.

Multiple RF/mmW Signal Generation

It is conventionally known to generate mmW frequencies by beating two optical carriers. Recent technological advances enable the generation and control of a number of such optical carriers on a single optical fiber, from which a number of different RF/millimeter wave functions may be generated and/or a number of RF/millimeter wave ports may be fed. One particular technique developed by the present inventors leverages optical frequency combs to take advantage of optical component nonlinearities, such as those arising from the non-linear region of a Mach-Zehnder interferometer and/or the non-linear behavior of optical ring resonators. By cascading these types of components, the present inventors have demonstrated successful generation of a very large number (i.e., greater than 128) of optical carriers or tones, along with the ability to flexibly select and modulate the tones generated thereby. The present inventors have demonstrated how the resulting RF/mmW frequencies may be controlled by controlling the spacing of the optical carriers.

Accordingly, there is a further desire in the field to develop new techniques for implementing photonic-assisted antenna systems, such as the Rotman lens, for ultra-wideband applications using multiple spaced optical carriers. Exemplary optical filtering and frequency selectivity solutions are described further below with respect to FIGS. 2 and 3.

Figure 2:
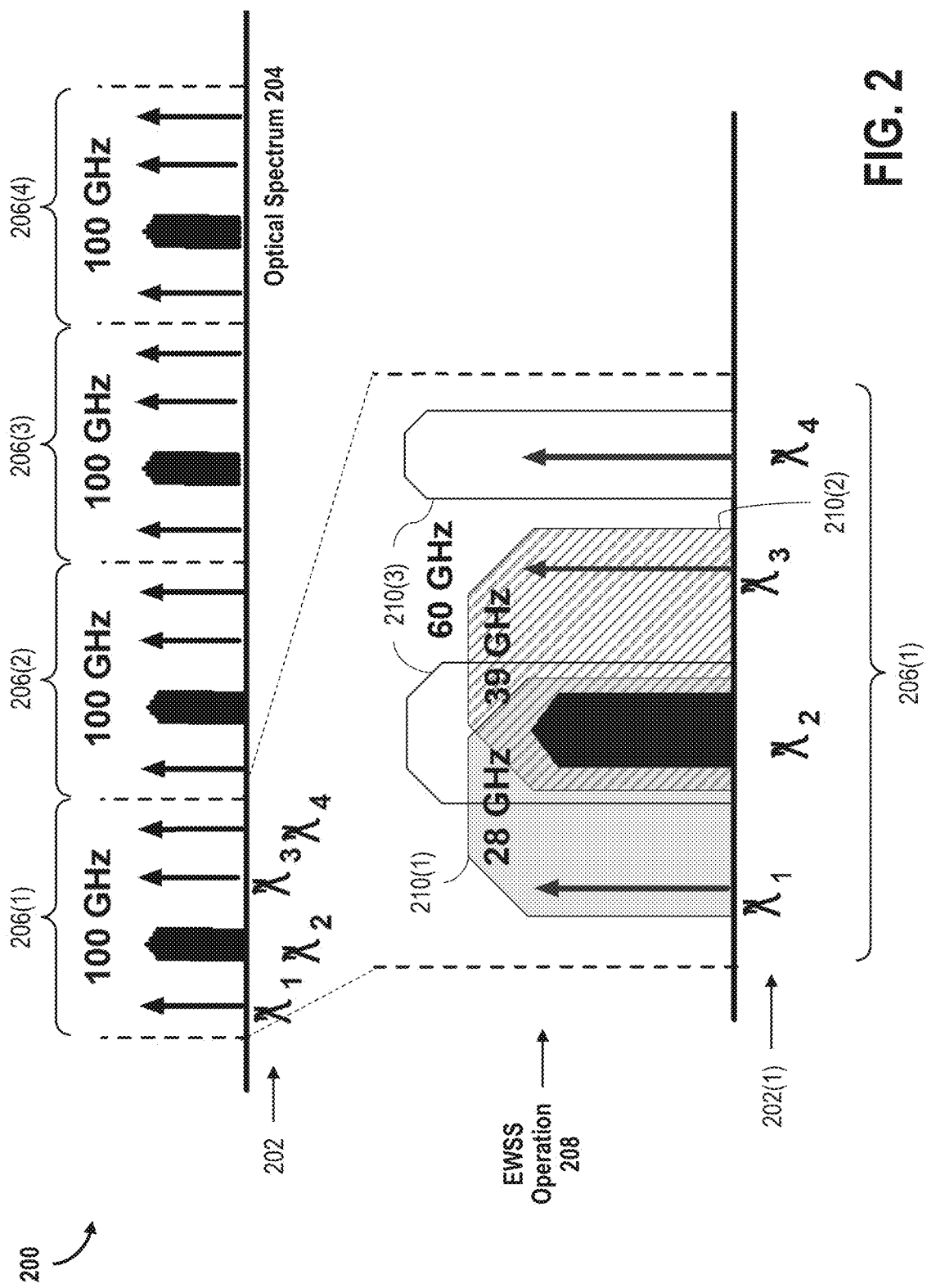
FIG. 2 is a graphical illustration depicting an exemplary optical tone distribution and filtering scheme, in accordance with an embodiment.

FIG. 2 is a graphical illustration depicting an exemplary optical tone distribution and filtering scheme 200. In an exemplary embodiment, a plurality of optical carriers 202 are distributed along an optical spectrum 204 at regularly spaced frequency regions 206 (100 GHz spacing, in the example illustrated in FIG. 2). In exemplary operation, an edge wavelength switching system (EWSS) 208 (described further below with respect to FIGS. 5-8) selectively applies one or more programmable optical filters 210 to select particular optical carriers 202 to reach a photodiode (shown in FIG. 5) where optical beating occurs and the RF/mmW signal is generated.

In the embodiment illustrated in FIG. 2, for ease of explanation, a first spaced frequency region 206(1) is shown to have four individual optical carriers 202, labeled $\lambda_1$, $\lambda_2$, $\lambda_3$, and $\lambda_4$, respectively. The person of ordinary skill in the art will understand though, that more or fewer optical carriers 202 may be transmitted within each spaced frequency region 206. In this example $\lambda_2$ is depicted to represent a modulated optical signal containing data, whereas $\lambda_1$, $\lambda_3$, and $\lambda_4$ are depicted to represent unmodulated optical carriers or tones.

In further operation of scheme 200, once multiple optical carriers 202 have been generated at a desired frequency spacing (e.g., spaced frequency regions 206), EWSS 208 applies one or more optical filters 210 to enable frequency selective functionality. That is, operation of EWSS on the optical carriers 202 filters selected optical carriers 202 to reach a photodiode for optical and the RF/mmW signal generation. More specifically, in the example depicted in FIG. 2, application of a first optical filter 210(1) (e.g., a bandpass filter (BPF)) enables passage of modulated signal 22 and unmodulated signal $\lambda_1$, such that the two filtered carriers 202 may be combined at the photodiode to beat together and generate a 28 GHz mmW carrier with the modulated baseband signal on 22. Additionally, or alternatively, application of a second optical filter 210(2) allows passage of 22 and 23 to a different (in the additive scenario), or the same (in the alternative scenario), photodiode to beat together and generate a 39 GHz mmW signal.

The person of ordinary skill in the art will further understand that operation of EWSS 208 is not limited to only adjacent optical carriers 202. EWSS 208 may be configured to select any two optical carriers 202 within a spaced frequency region 206 to beat together at the photodiode. For example, as shown in FIG. 2, application of a third optical filter 210(3) (e.g., a pair of BPFs) to modulated signal 22 and unmodulated signal 24 enables passage of two optical carriers 202 that are not immediately adjacent, but which then beat together at a photodiode to generate a 60 GHz mmW signal.

The person of ordinary skill in the art will further understand that these exemplary mmW frequencies of 28 GHz, 39 GHz, and 60 GHz are provided by way of example, and not in a limiting sense. Other frequencies may be generated at the photodiode by the deliberate selection by the EWSS, and according to the frequency spacing implemented for optical spectrum 204, without departing from the scope herein. The person of ordinary skill in the art will further understand that the operation of EWSS 208 is substantially agnostic of the individual center frequencies of a selected optical carrier 202. Operation of scheme 200 is based on the spacing between two optical carriers 202, instead of the wavelength of the carrier itself. Accordingly, scheme 200 is of particular utility to spaced optical carriers generated from 1 GHz to hundreds of GHz or sub-Terahertz (Sub-THz).

Therefore, through coordinated control of EWSS 208 (e.g., from a central location or hub), and with proper selection of optical carriers 202 to beat, multiple RF/mmW signals may be advantageously generated in the optical domain, and with no need to first upconvert a selected frequency in the electrical domain. This all-optical signal selection approach to filtering scheme 200, when implemented for a feed network to a Rotman lens (described further below with respect to FIG. 5), enables ultra-wide frequency selectivity that was not disclosed or realized by the recent proposal to merely substitute a Rotman lens for a conventional antenna system for mmW signals. This earlier recent proposal simply utilized the single RF signal from the conventional antenna system for improved steering using the Rotman lens, but did not contemplate simultaneous transmission of multiple different mmW signals through the same lens.

Figure 3:
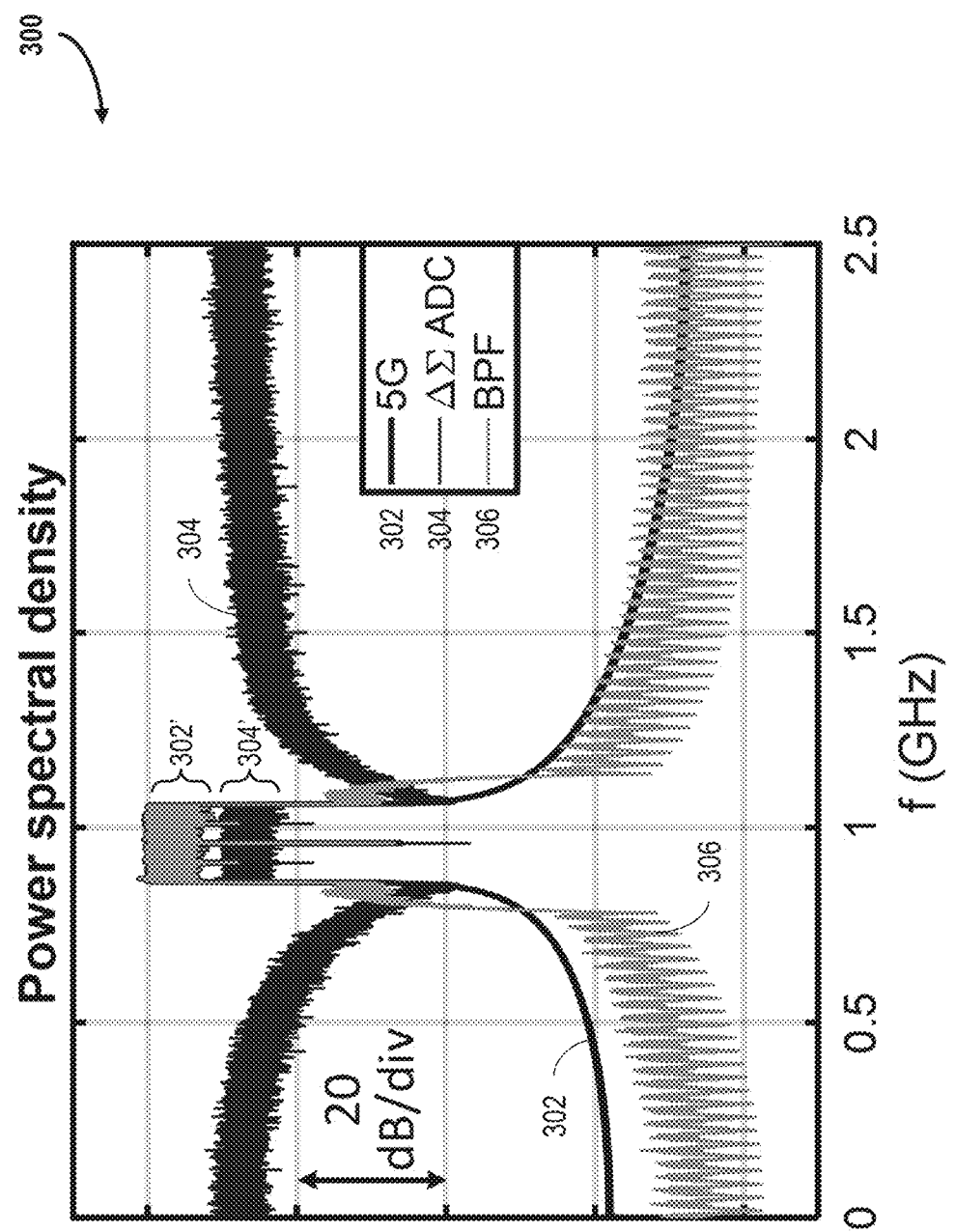
FIG. 3 is a graphical illustration depicting an exemplary spectral plot of optical signals implementing the optical filtering scheme depicted in FIG. 2.

FIG. 3 is a graphical illustration depicting an exemplary spectral plot 300 of optical signals 302, 304 implementing optical filtering scheme 200, FIG. 2. More specifically, plot 300 illustrates exemplary results of an operation of filtering scheme 200 on a first optical signal 302 (a digitized 5G signal, in this example) and a second optical signal 304 (a digitized delta sigma signal, in this example) utilizing an optical filter 306 (a BPF, in this example). The response of optical filter 306 shown in plot 300 may, for example, be similar to a filter response of one or more of optical filters 210, FIG. 2. Within the bandpass region of optical filter 306, filtered portions of first optical signal 302' and second optical signal 304' may be observed.

Plot 300 thus demonstrates the spectrum of a 5G signal (i.e., first optical signal 302) that was delta sigma digitized (i.e., second optical signal 304) along with a signal recovery BPF (i.e., optical filter 306) and original analog 5G signal. To achieve the results shown on plot 300, real-time bandpass delta sigma modulation was implemented through a field programmable gate array (FPGA) using a high sampling rate to encode 5G/6G signals having a high bandwidth and a high modulation order.

The present inventors have pioneered techniques for digitizing RF signals to significantly simplify their transmission through relatively low-cost digital optical transport techniques, but while retaining the properties of the original, non-digitized RF signal. This technique is referred to as Delta Sigma Digitization (DSD), and which demonstrates approximately four times better efficiency than previous digitization techniques, such as the conventional Nyquist digitization of RF signals used in the mobile communication Common Public Radio Interface (CPRI).

To achieve DSD, an analog/RF signal of interest is oversampled to generate a digitized signal. The quantization noise of the oversampled digitized signal is then manipulated using a specially designed transfer function that moves the quantization noise away from the data portion of the digitized signal such that the quantization noise may be easily separated, in the digital realm, from the portion of the signal spectrum carrying the data. The digital signal containing the data information and quantization noise may then be transported, through relatively inexpensive digital optics, to an opposing receiver, which contains a filtering mechanism corresponding to the transfer function used to digitize the original analog/RF signal. At the receiver, the received noise portion of the signal may be pushed away from the data portion of the signal using the filter corresponding to the DSD transfer function, and thereby filter out the noise from the data at the receiver. The final resulting filtered signal at the receiver is then essentially a substantive digital copy of the original analog/RF signal that was oversampled.

As described immediately above with respect to FIG. 3, and also further below with respect to FIG. 4, the systems and methods described herein, which integrate a Rotman lens-based antenna system with a feed network implementing EWSS optical filtering-based RF signal selectivity, lend themselves to improved operation of a number of different signal types that may be beat together at a photodiode and then fed (e.g., through an amplifier to boost the signal strength prior to transmission through a Rotman lens) to a feed point (e.g., feed point 102, FIG. 1) on the focal arc (e.g., focal arc 104, FIG. 1) on the Rotman lens (described above with respect to FIG. 1, and further below with respect to FIG. 5.

Antenna Remoting, Centralization and Virtualization Functionality

The functionality available through the EWSS (e.g., EWSS 208, FIG. 2) may be still further enhanced through the implementation of flexible signal generation techniques at a centralized hub location. For example, from a centralized hub, the RF/mmW signals may be generated using software defined radio techniques more easily controlled and protected at the hub, which thereby provides significantly improved flexibility to enable generation of any type of desired signal, according to the needs of the user and related application(s), and limited only by system operating constraints.

Figure 4:
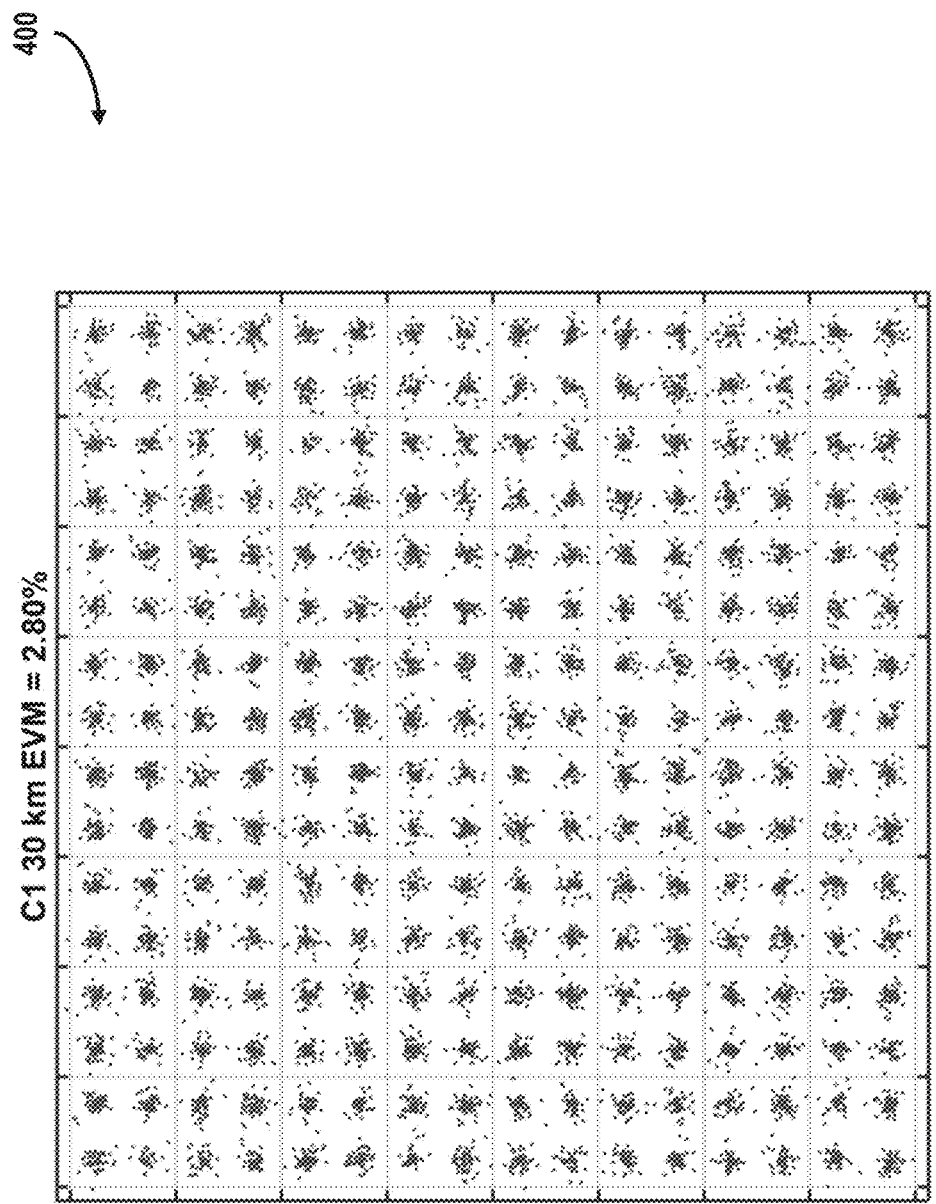
FIG. 4 is a graphical illustration depicting a constellation diagram generated from the spectral plot depicted in FIG. 3.

FIG. 4 is a graphical illustration depicting a constellation diagram 400 generated from spectral plot 300, FIG. 3. More specifically, constellation plot 400 demonstrates how the present EWSS optical filtering-based frequency selectivity techniques further produce high-order constellations (256 QAM, in this example) of good quality. To produce constellation results shown on installation plot 400, transmission was performed over a 30 km optical fiber, and with an error vector magnitude (EVM) of 2.80%.

Thus, by thoughtful application of the DSD transfer function on the transmitter side, a relatively simple and inexpensive BPF (or other passive or active filters) at the receiver side are enabled to function as a relatively simple but effective digital-to-analog converter (DAC). In the mobile application scenario, an all-digital delta-sigma design according to these principles enables the centralized architecture (e.g., at the hub) having the most RF layer functions to be consolidated in mobile network's distributed unit (DU), thereby eliminating the separate need for a DAC, a local oscillator and/or RF mixer at a corresponding remote radio unit (RRU). All of these additional elements are required by the conventional radio system. By implementing DSD to the optical carriers a much lower-cost, lower-power, and smaller-footprint cellular site may be effectively realized.

Moreover, these same advantages may be similarly harnessed for military environments, where it is desirable to develop easily portable antenna and radar systems having ultra-wideband capabilities, but which may be produced at much lower costs, significantly wider bandwidths in addition to merely the proposed wider steering range, and all while operating at significantly lower power than conventional antenna systems and feed networks.

Several exemplary embodiments of photonically-integrated antenna systems having an EWSS-based feed network as an end-to-end radio system are described further below with respect to FIGS. 5-8.

End-to-End Radio System

By integrating the EWSS optical filtering-based RF signal selection techniques, described immediately above, as a feed network for a Rotman lens-based antenna system, the present systems and methods realize significant improvements and advantages over conventional radio systems, including the recent proposals to substitute a Rotman lenses for the more traditional mmW antenna system.

According to the embodiments herein, a greatly simplified radio front end is realized when implemented together with a photonically-integrated antenna system (e.g., including a Rotman lens or the like). As described above, because operation of EWSS 208, FIG. 2, is primarily in the optical domain, as well as all signal processing and frequency selectivity, there is no need for complex up-conversion hardware or processing in the electrical domain until the mmW signals are generated at the photodiode(s). In some cases, it may be desirable to add some amplification along the optical signal paths, and/or after the signals generated from the beating at the photodiode. Furthermore, by centralizing control a single remote location (e.g., a hub), the phase and amplitude of the plurality of optical carriers (e.g., optical carriers 202, FIG. 2) may be programmed using a wavelength selective switch. An end-to-end-radio system, including a hub, is described further below with respect to FIG. 5.

Figure 5:
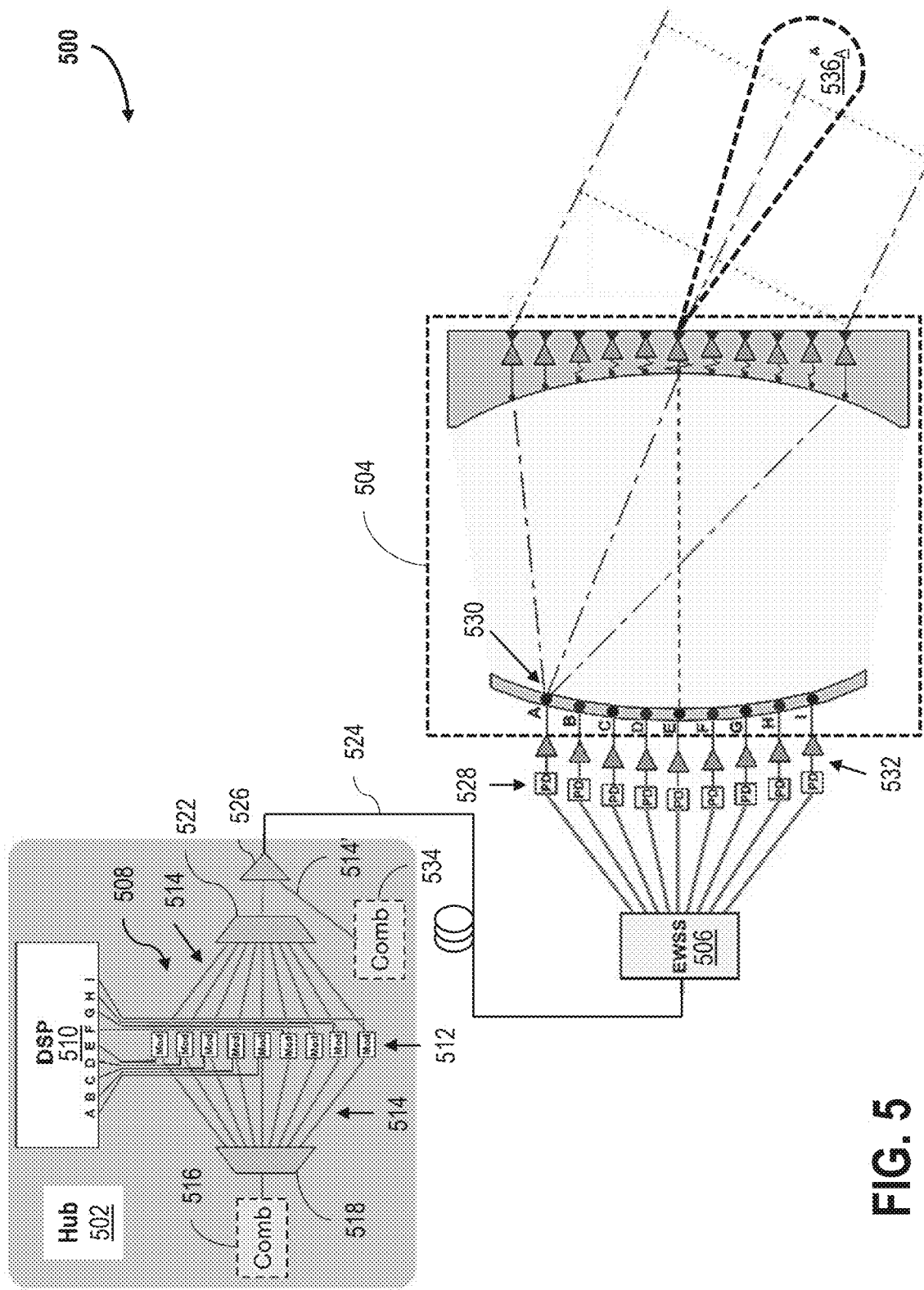
FIG. 5 is a schematic illustration of an exemplary photonic based radio system, in accordance with an embodiment.

FIG. 5 is a schematic illustration of an exemplary photonic based radio system 500. In an embodiment, radio system 500 includes a hub 502, an optically integrated broadband antenna subsystem 504 (e.g., a Rotman lens), and an EWSS 506 disposed therebetween. In an exemplary embodiment, EWSS 506 is substantially similar to EWSS 208, FIG. 2, and is disposed proximate broadband antenna subsystem 504. In the exemplary embodiment depicted in FIG. 5, radio system 500 is described with respect to the downlink transmission mode.

In an embodiment, hub 502 includes an RF signal modulation subsystem 508 having a transmission digital signal processor (DSP) 510 and a plurality of modulators 512. In an exemplary embodiment, transmission DSP 510 of RF signal modulation subsystem 508 is configured to implement software defined radio techniques to generate an RF signal, and then digitize the generated RF signal using DSD. The resulting delta sigma digital stream(s) may then be provided to modulators 512 to modulate one or of a plurality of unmodulated optical carriers 514 provided to or by hub 502. In an exemplary embodiment, hub 502 optionally includes a first optical frequency comb generator 516 configured to generate the plurality of unmodulated optical carriers 514, which may then be separately provided to respective modulators 512 through a demultiplexer 518.

In further exemplary operation of radio system 500, each modulator 512 outputs at least one modulated optical carrier 520, and the resultant plurality of modulated optical carriers are aggregated, e.g., by a multiplexer 522, with one or more of unmodulated optical carriers 514, with the resultant aggregate optical signal thereof then fed into an optical link 524 (e.g., an optical fiber), and optionally, after amplification by an optical amplifier 526.

In an embodiment, downstream of hub 502, EWSS 506 is optically connected (e.g., by optical fibers or free space optics (FSO)) to a plurality of photodiodes 528 disposed in an array facing feed points 530 of broadband antenna subsystem 504. In this example, feed points 530 may be substantially similar to feed points 102 of lens 100, FIG. 1. In an exemplary embodiment, each photodiode 528 is configured to receive at least two of optical carriers 514, 520 from EWSS 506, as described above with respect to scheme 200, FIG. 2, such that the two optical carriers 514, 520 may beat within the particular photodiode 528, which in turn may then generate an up-converted (e.g., mmW) signal at a target frequency. In some embodiments, the output of each photodiode 528 may feed into a respective electrical signal amplifier 532 disposed between the particular photodiode 528 and a respective feed point 530.

In exemplary operation, each of the amplified signals reaching the array of feed points 530 may propagate through broadband antenna subsystem 504 in a manner similar to that described above with respect to the operation of lens 100, FIG. 1. Different though, from lens 100, because broadband antenna subsystem 504 utilizes EWSS 506 for its feed network, broadband antenna subsystem 504 is advantageously enabled to simultaneously propagate a plurality of different signals, at different respective frequencies, within the same single lens architecture.

Thus, through integration with radio system 500, broadband antenna subsystem 504 operates as an ultra-wideband downlink antenna having frequency selectivity control not realized through conventional approaches. This control of frequency selectivity, also referred to as "frequency agility," is significantly advantageous over conventional proposals, which are generally limited to the particular frequency of the signal being beamed. Existing telecommunication networks, for example, typically operate at their own selected frequency range. In the electrical domain, it is very complex to change the frequency targeted by a particular antenna system. In contrast, as described above with respect to scheme 200, FIG. 2, dynamic frequency selectivity and frequency agility may be achieved much more easily, comparatively, in the optical domain.

In the embodiment depicted in FIG. 5, some optical carriers sent to EWSS 506 remain unmodulated (i.e., unmodulated optical carriers 514) to enable a receiving photodiode 528 to generate the appropriate up-converted signal from the optical beat of an unmodulated carrier 514 with a modulated carrier 520. In some embodiments, unmodulated optical carriers 514 may be directly provided to demultiplexer 522 from multiplexer 518. In other embodiments, hub 502 may further include a second optical comb generator 534, which is phase-synchronized with first optical comb generator 516, and which may function to generate unmodulated carriers 514' that are identical to the original unmodulated optical carriers 514.

The plurality of unmodulated and modulated optical carriers 514, 520 are thus wavelength-multiplexed onto optical link 524, e.g., an optical fiber, to enable longer distance transport to EWSS 506. As described herein, EWSS 506 is advantageously configured to select and combine the appropriate modulated and unmodulated carriers 520, 514 such that individual photodiodes 528 will generate the desired frequency signal at a respective selected feed point 530 (e.g., a Rotman lens port). From each feed point 530, the particular frequency signal propagates through broadband antenna subsystem 504, which then generates a desired beam 536 as an output therefrom.

The approach of radio system 500 is therefore significantly advantageous over conventional approaches, in that EWSS 506 is further configured to select a different pair of modulated/unmodulated optical carriers 520/514 if a different feed point/port 530 and a different frequency is desired for downlink transmission of a different beam 536 (described further below with respect to FIG. 6). Radio system 500 thus represents a significant reduction in complexity for the feed network to the Rotman lens. That is, transmission DSP 510 and EWSS 506 cooperatively rely on characteristics of the Rotman lens to greatly reduce the complexity, and therefore cost, at the radio site. Additionally, through centralized implementation of the signal selection and frequency agility at hub 502, systems and methods according to the embodiment depicted in FIG. 5 further realize superior capability for virtualization and flexible software control.

Radio system 500 thus represents an innovative centralized multi-beam radio system utilizing a Rotman lens (or the like) to eliminate the need for dedicated up-conversion of signals fed to broadband antenna subsystem 504. The present system and methods realize still further benefits from the easy scalability of the simplified system architecture. For example, Rotman lenses that are properly designed for the integrated ultra-wideband implementations described herein, may be printed in large quantities through electronic printing technology, and much more easily and inexpensively then the conventional machined Rotman lenses recently proposed for mmW applications. As the target frequencies increase, the size and cost of such printed Rotman lenses are further reduced, thereby achieving even smaller footprints for the antenna subsystem, with relatively easy placement on antenna towers or portability.

Accordingly, for the downlink scenario illustrated in FIG. 5, centralized control of broadband antenna subsystem 504 removes the need for up-conversion by the remote radio, while drastically reducing the complexity of beamforming through antenna subsystem/Rotman lens 504. Additionally, the centralized control at the hub location enables functionality, such as software defined radio and DSD, to be securely implemented in software executed from hub 502. This centralization of functionality thus further provides significant flexibility to hub 502 for customization and/or on-demand adaptation to the many changing scenarios that field operations may desire or require.

Figure 6:
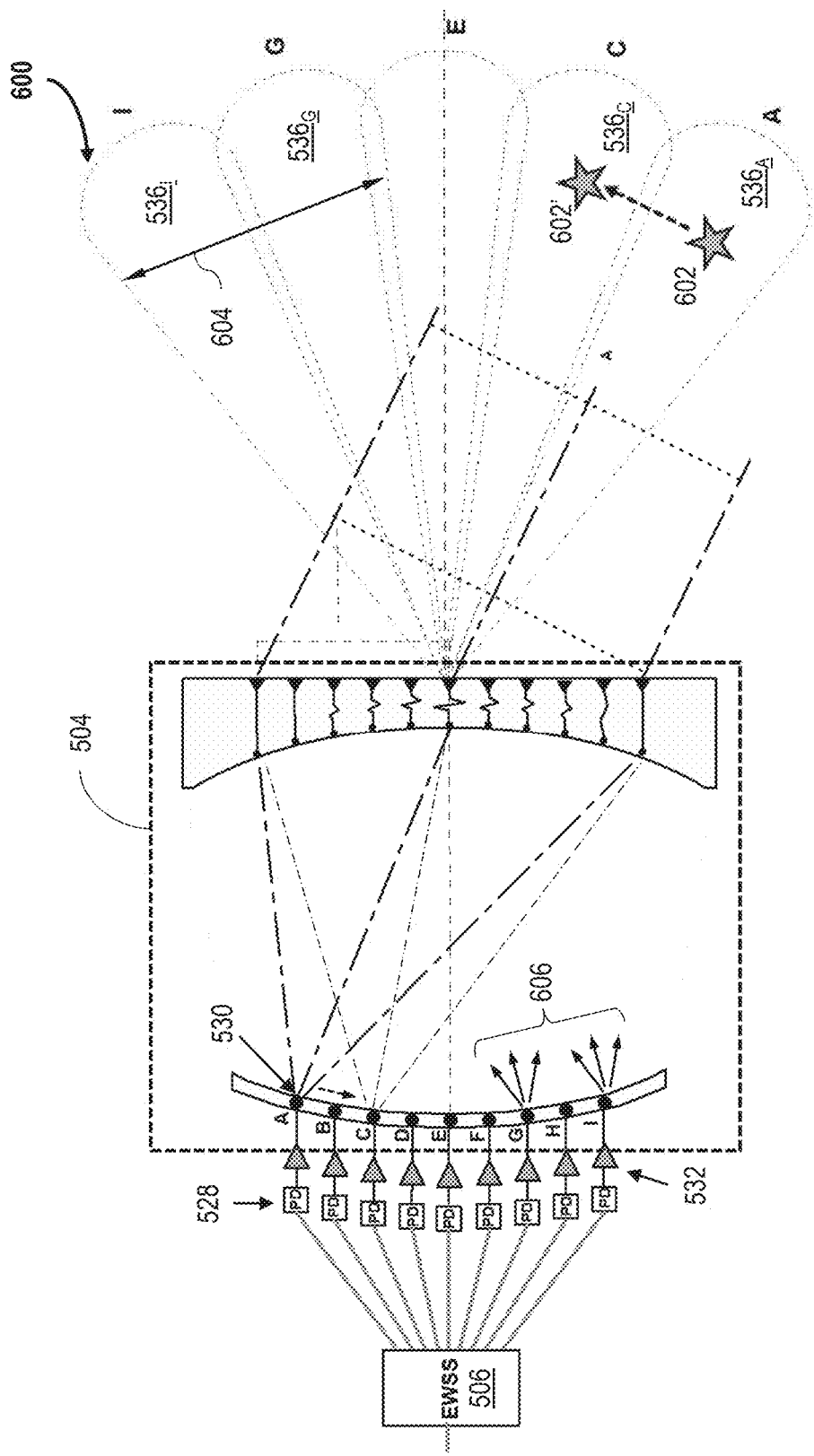
FIG. 6 is a schematic illustration depicting an operational principle of the broadband antenna system depicted in FIG. 5.

FIG. 6 is a schematic illustration depicting an operational principle 600 of broadband antenna subsystem 504, FIG. 5. As described above, the conventional implementation of Rotman lenses is configured to scan the array of feed points 530 for a single frequency broadcast over a plurality of beams 536, each having substantially the same angular with of coverage (e.g., 20°), with some overlap of adjacent beams 536. In the case of a target 602 (e.g., a mobile communication device) moving from the coverage area of a first beam 536 (beam $536_A$, in the example shown in FIG. 6) to the coverage area of an adjacent beam 536 (beam $536_C$, in this example), a conventional scanning system will reach the moved target 602' by shifting from the feed point 530 generating the signal for the first beam $536_A$ (feed point $530_A$, in this example) to the feed point 530 generating the signal for the adjacent beam $536_C$ (e.g., feed point $530_C$). Systems and methods according to radio system 500 though, are advantageously able to accomplish such feed point shifting through operation of EWSS 506, which is a significantly less complex operation than what is required for the conventional technique.

According to operational principle 600 though, the ultra-wideband capabilities of radio system 500 further enable radio system 500 to achieve beam synthesis between two or more generated beams 536. For example, it may be desirable in some cases to have two or more adjacent beams 536 (beams $536_G$ and $536_I$, in the example depicted in FIG. 6) generate the same RF signal to effectively realize a synthesized beam $536_{G-I}$ having a synthesized beam width 604 twice that of any one of the individual beams 536. In this case, EWSS 506 may be configured to select unmodulated and modulated optical carriers 514, 520 such that the respective photodetectors 528 feeding into feed points $530_G$ and $530_I$ generate the same signal 606 for propagation through antenna subsystem 504.

Synthesized beam width 604 may be further increased by utilizing the frequency selectivity techniques described herein to feed signal 606 into one additional adjacent feed points 530. Other feed points 530 will continue propagate signals different from signal 606. This innovative beam synthesis technique is of particular value in the case where a single antenna subsystem 504 services multiple coverage areas of different respective user densities. Whereas narrower beam widths may be desirable for high-density coverage areas, some network operators they prefer to synthesize a wider beam width 604 to service larger geographic areas having lower overall user density.

Figure 7:
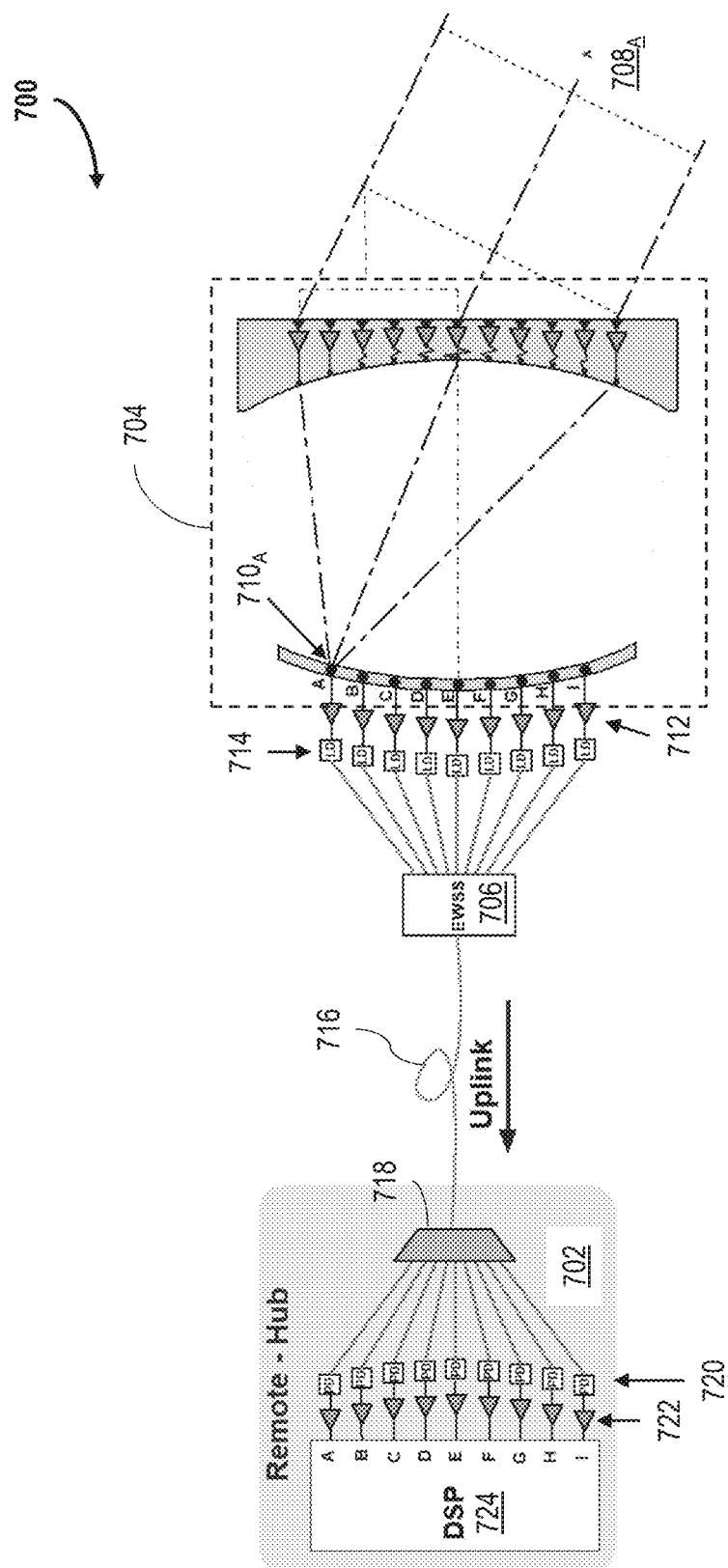
FIG. 7 is a schematic illustration of an uplink implementation of the radio system depicted in FIG. 5.

FIG. 7 is a schematic illustration of an uplink implementation 700 of radio system 500, FIG. 5. In an exemplary embodiment, similar to radio system 500, uplink implementation 700 includes a hub 702, an optically integrated uplink antenna subsystem 704 (e.g., a Rotman lens), and an EWSS 706 disposed therebetween. In some embodiments, hub 702 may be the same as, or integrated with, hub 502, FIG. 5. Similarly, EWSS 706 may be the same as, or integrated with, EWSS 506, FIG. 5. In the exemplary embodiment, uplink antenna subsystem 704 is separate and distinct from antenna subsystem 504, FIG. 5, in the downlink scenario.

For example, although the same Rotman lens may be utilized for both downlink and uplink communication, the present inventors have found that the reduced complexity of end-to-end radio system 500 renders it easier and less expensive to separate the downlink antenna functionality from the uplink antenna functionality. According to the present systems and methods, Rotman lenses of reduced size and complexity may be mass-produced rather inexpensively, in comparison with the multiple radio system components that may be eliminated by the integration thereof. In particular, at higher frequencies, Rotman lenses may be printed on microwave circuit laminates, thereby rendering it relatively affordable to keep the downlink and uplink decoupled on separate boards. This decoupling thus facilitates further the simplification of the system design, merely duplicating some hardware without significantly changing the overall design thereby.

Furthermore, by separating the uplink and downlink functionality, damage to one of the antenna subsystems 504, 704 will not affect the other subsystem. Additionally, frequency agility achieved by the present systems and methods may be more easily applied differently to downlink broadband antenna subsystem 504 and to uplink antenna subsystem 704. Moreover, as radio system 500 scales over time, it may be desirable to have more or fewer uplink antenna subsystems 504 than downlink antenna subsystems 704.

In the exemplary embodiment, uplink antenna subsystem 704 receives wireless information from a source (not shown in FIG. 7) within a coverage area of a wavefront 708, propagates the received wireless information through uplink antenna subsystem 704 (i.e., in "transmit mode") to reach a particular feed point 710 (feed point 710A, in the example depicted in FIG. 7). From the particular feed point 710, the propagated information signal may be amplified a particular uplink signal amplifier 712, of an array of uplink signal amplifiers 712, which is in communication with the particular feed point 710. The amplified signal from uplink signal amplifier 712 is then fed to one envelope detector 714, of an array of respective envelope detectors 714, where simple down-conversion may be implemented to transmit received wireless information in baseband, first to EWSS 706, and then to hub 702 as an aggregated baseband signal over an optical communication link 716. Optical communication link 716 may, for example, be the same optical fiber as optical communication link 524, FIG. 5.

At hub 702, the aggregated signal from optical communication link 716 is separated into individual optical carriers by demultiplexer 718. The separated optical carriers may then be converted by individual respective photodetectors 720, amplified by respective hub amplifiers 722, and then processed by an uplink DSP 724. From this exemplary configuration, it may be seen that the overall design simplicity of radio system 500 may be maintained for both the downlink and the uplink implementations.

Figure 8:
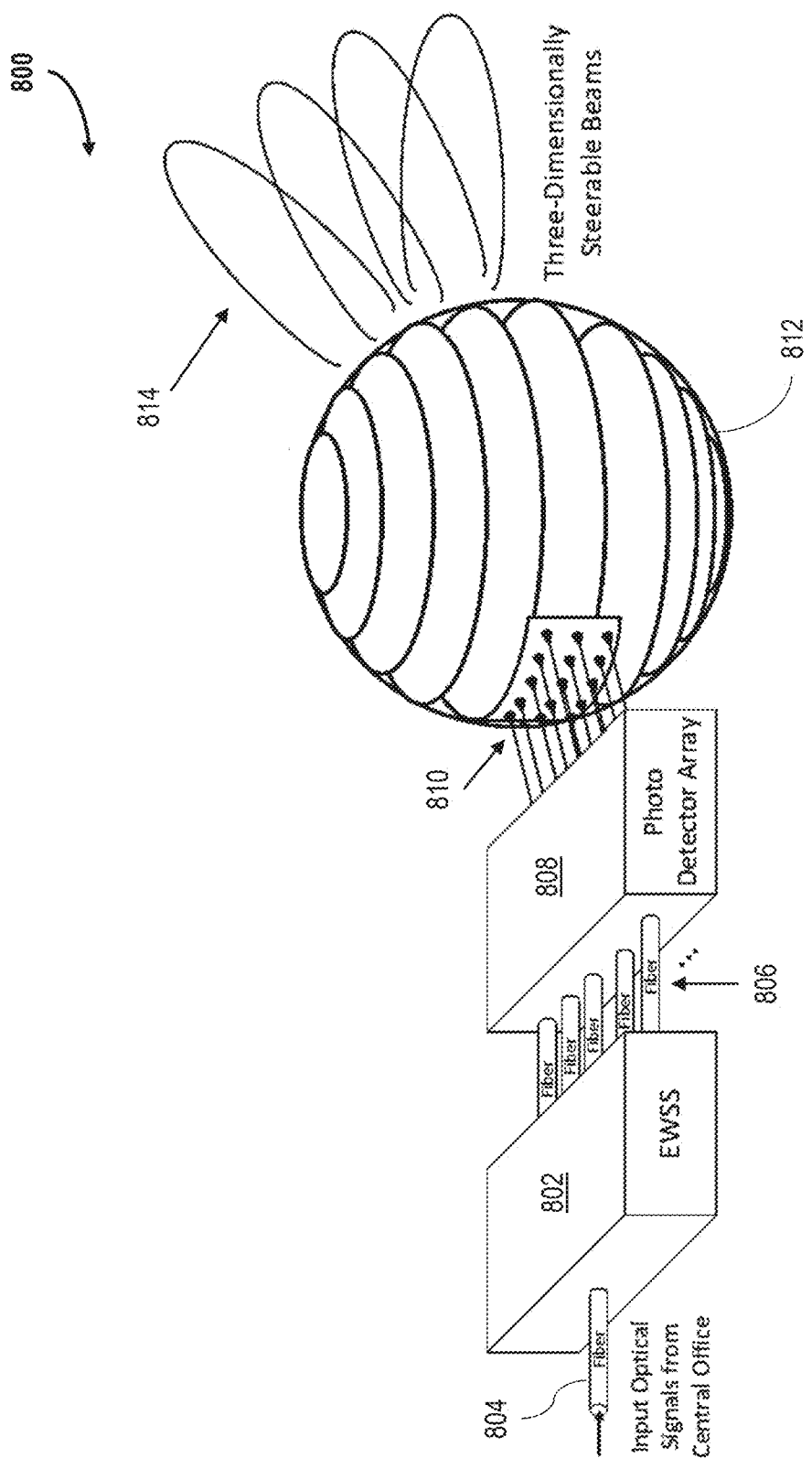
FIG. 8 is a schematic illustration of an exemplary photonics-assisted three-dimensional antenna system, in accordance with an embodiment.

FIG. 8 is a schematic illustration of an exemplary photonics-assisted three-dimensional (3D) antenna system 800. In an exemplary embodiment, 3D antenna system 800 is similar, in many aspects to the 2D (e.g., Rotman lens-based) antenna systems and subsystems described above, and includes an EWSS 802 configured to receive input optical signals (i.e., in the downlink scenario) from a central office or hub (not shown in FIG. 8) over an optical communication link 804 (e.g., optical fiber), and perform frequency selectivity and optical filtering on the received optical signals in a manner similar to that described above with respect to scheme 200, FIG. 2.

From EWSS 802, the selected/filtered optical signals are respectively fed (e.g., over short optical fibers 806) to a photodetector array 808, which may, for example, be functionally similar to photodetector array 528, FIG. 5, and generate a plurality of converted signals from the optical beating of the selected optical signals. The generated converted signals are then fed to respective feed points 810 of a 3D antenna subsystem 812 (e.g., a Luneburg lens), which then functions to propagate the converted signals and output a plurality of three-dimensionally steerable beams 814.

In this example, the general functionality of 3D antenna subsystem/Luneburg lens 812 is substantially similar to the functionality of 2D antenna subsystem/Rotman lens 504, FIG. 5, except that feed points 810 are arrayed in a curved plane, as opposed to a linear arc, and steerable beams 814 are effectively broadcast in all directions, as opposed to a generally circular plane. Although Luneburg lenses are generally more expensive than Rotman lenses, a network operator may find it desirable to be able to transmit (and/or receive) wireless communications for multiple vertical targets and coverage areas (e.g., air traffic, mountainous terrain, etc.), and not just only for relatively homogeneous targets/coverage areas (e.g., mobile phone devices). Accordingly, photonics assisted antenna system 800, based on Luneburg lens, may be effectively implemented according to the same overall design considerations as the 2D, Rotman lens-based, radio system 500, with the need only to adjust the software functionality for the particular application.

Where desired, antenna system 800 is a cost-effective solution because Luneberg lenses may be manufactured using 3D printing technology. A Luneburg lens, for example, is composed of multiple spherical layers with different respective dielectric constants. By engineering the dielectric-constant distribution and through oscillation and interference inside the cavity, the Luneburg lens is able to convert a point RF source on its surface (e.g., at feed points 810) into a plenary wave in the far field on an opposing surface of the lens. By changing the location of the RF excitation point on its surface, the RF beam is then easily into different directions from the transmitting surface. When integrated with the photonics-assisted beam selection, control, and management techniques described herein, which easily switch selected RF signals into different feeder inputs (e.g., feed points 810), a Luneburg lens-based antenna system (e.g., system 800) enables considerably more flexible, accurate, and multi-frequency beamforming, thereby rendering embodiments according to system 800 particularly promising candidates for developing radar and sensing applications.

As described above, conventional antenna and radio systems have evolved to a very high level of complexity. With the increasing number of antenna elements, the associated feed networks have also become considerably more intricate, lossy, and narrowed in bandwidth. Cascading these RF/microwave elements thus results in an even higher level of complexity, which renders conventional implementation of wideband very difficult. These challenges are solved according to the present systems and methods, which advantageously leverage lensing concepts to perform a number of conventional radio/antenna functions in the optical domain, thereby enabling significant system flexibility improvements, including, but not limited to, signal digitization, ultra-wide bandwidth, cost reduction, lower power consumption, smaller footprint, and later weight systems.

In some embodiments, one or more optical frequency combs are implemented at the centralized hub location, thereby enabling easily scalable generation and control of remote RF/microwave signals. Such implementations may be of particular benefit to radio systems employing a large number of antenna elements. According to the present systems and methods, beam synthesis of selected frequencies may be easily realized, and the overall cost of the multiple antenna elements may be significantly reduced through these scalability advantages.

According to the systems and methods herein, intelligent implementation of an EWSS advantageously enables a significantly improved capability for flexible selection of optical carrier pairs for microwave frequency generation through optical beating. The frequency agility realized thereby further enables easy frequency selection in the optical domain, as well as improved system adaptability for wideband and multi-band applications using the same single antenna subsystem. Such additional capabilities further enable the beam synthesis advantages described above, as well as on-demand/dynamic control, and also significant system cost reductions by enabling multi-purpose operation from a single antenna system/subsystem.

Additionally, in some 2D antenna embodiments, implementation of a Rotman lens for beamforming simplifies the overall system into a true-time delay beamforming network for multi-/ultra-wideband beam generation. These same advantages may be further realized for 3D antenna embodiments, for example, through implementation of a Luneburg lens (or the like).

Furthermore, the embodiments described herein readily lend themselves to implementation of delta sigma digitization, which is particularly advantageous when centralized at a secure location (e.g., a hub) for coordinated virtualization and frequency agility. Implementation of DSD to selected signals enables the use of lower power antenna systems without sacrificing the flexibility, adaptability, multi-frequency, multi-use, or reduced complexity advantages described above. Additionally, by reducing the necessary power to the antenna system, the antenna system be expected to achieve a significantly longer operational lifespan.

The present systems and methods thus considerably improve upon conventional radio/antenna system techniques, and even upon recent proposals to implement Rotman lenses for mmW signals. Even these most recent proposals do not address the considerable additional advantages described above with respect to the embodiments herein.

Exemplary embodiments of optically integrated antenna systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user stage.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A radio system, comprising:
   a feed network configured to aggregate a plurality of unmodulated optical carriers and modulated optical carriers for delivery to an optical link;
   an edge wavelength switching system (EWSS) configured to (i) receive the plurality of unmodulated optical carriers and modulated optical carriers for delivery to an optical link, and select a first unmodulated carrier and a first modulated carrier as a first selected optical carrier pair;
   a first photodetector configured to (i) receive the first selected carrier pair from the EWSS, and (ii) generate a first electrical signal from an optical beat of the first unmodulated carrier with the first modulated carrier; and a broadband lens-based antenna subsystem configured to (i) receive the first electrical signal from the first photodetector, (ii) propagate the received first electrical signal through a lens body, and (iii) output a first directional wireless beam signal containing signal data from the first modulated carrier.

2. The radio system of claim 1, wherein the plurality of unmodulated optical carriers and modulated optical carriers are spaced apart from one another along an optical spectrum.

3. The radio system of claim 2, wherein the EWSS is further configured to select the first selected optical carrier pair using an optical bandpass filter (BPF).

4. The radio system of claim 3, wherein the first unmodulated carrier and the first modulated carrier are immediately adjacent one another along the optical spectrum.

5. The radio system of claim 3, wherein at least one intervening optical carrier is disposed between the first unmodulated carrier and the first modulated carrier along the optical spectrum.

6. The radio system of claim 5, wherein the optical BPF includes (i) a first filter portion tuned to an optical frequency of the first unmodulated carrier, and (ii) a second filter portion tuned to an optical frequency of the first modulated carrier.

7. The radio system of claim 2, wherein the EWSS is further configured to select a second unmodulated carrier to pair with the first modulated carrier as a second selected optical carrier pair.

8. The radio system of claim 7, further comprising a second photodetector configured to (i) receive the second selected carrier pair from the EWSS, and (ii) generate a second electrical signal from an optical beat of the second unmodulated carrier with the first modulated carrier.

9. The radio system of claim 1, further comprising an array of photodetectors including the first photodetector, and wherein the broadband lens-based antenna subsystem includes an array of feed points configured to receive a plurality of electrical signals generated by the array of photodetectors, respectively.

10. The radio system of claim 9, further comprising an array of electrical amplifiers disposed between respective ones of the array of photodetectors and the array of feed points.

11. The radio system of claim 9, wherein the array of photodetectors includes a second photodetector, wherein the array of feed points includes (i) a first feed point configured to receive the first electrical signal from the first photodetector, and (ii) a second feed point configured to receive a second electrical signal from the second photodetector.

12. The radio system of claim 11, wherein the broadband lens-based antenna subsystem is further configured to (i) output, based on the first electrical signal received at the first feed point, the first directional wireless beam signal at a first beam width and in a first beam direction, and (i) output, based on the second electrical signal received at the second feed point, a second directional wireless beam signal at a second beam width and in a second beam direction, wherein the first beam width is substantially equal to the second beam width, and wherein the second beam direction is different than the first beam direction.

13. The radio system of claim 12, wherein the array of photodetectors includes a third photodetector adjacent the second photodetector, wherein the array of feed points includes a third feed point configured to receive a third electrical signal from the second photodetector, wherein the broadband lens-based antenna subsystem is further configured to output, based on the third electrical signal received at the third feed point, a third directional wireless beam signal (i) at a third beam width equivalent to the second beam width, and (ii) in a third beam direction different than the first and second beam directions, wherein the third beam direction is substantially adjacent the second beam direction.

14. The radio system of claim 13, wherein the EWSS is further configured to select from among the plurality of unmodulated and modulated optical carriers such that the second and third directional wireless beam signals contain the same signal data.

15. The radio system of claim 14, wherein the second and third directional wireless beam signals are synthesized into a combined beam having a combined beam width greater than the second or third beam widths.

16. The radio system of claim 1, wherein the broadband lens-based antenna subsystem includes a Rotman lens.

17. The radio system of claim 1, wherein the broadband lens-based antenna subsystem includes a Luneburg lens.

18. The radio system of claim 1, wherein the a feed network includes an optical comb generator configured to generate the plurality of unmodulated optical carriers.

19. The radio system of claim 1, wherein the a feed network further includes a radio frequency signal modulation subsystem configured to generate the plurality of modulated optical carriers from the plurality of unmodulated optical carriers.

* * * * *